United States Patent
Malloy

[15] 3,693,478
[45] Sept. 26, 1972

[54] TRANSMISSION HAVING A CONVERTER CLUTCH AND A CONTROL

[72] Inventor: John D. Malloy, Troy, Mich.
[73] Assignee: General Motors Corporation, Detroit, Mich.
[22] Filed: Jan. 6, 1971
[21] Appl. No.: 104,224

[52] U.S. Cl..................................74/731, 74/645
[51] Int. Cl..............................................F16h 47/00
[58] Field of Search...............................74/731, 645

[56] References Cited

UNITED STATES PATENTS

| | | | |
|---|---|---|---|
| 3,252,352 | 5/1966 | General et al. | 74/645 |
| 3,073,179 | 1/1963 | Christenson | 74/645 |
| 3,313,181 | 4/1967 | Leonard et al. | 74/732 |

FOREIGN PATENTS OR APPLICATIONS

| | | | |
|---|---|---|---|
| 73,140 | 9/1953 | Netherlands | 74/731 |
| 634,248 | 1/1962 | Canada | 74/731 |

Primary Examiner—C. J. Husar
Attorney—W. E. Finken, A. M. Heiter and D. F. Scherer

[57] ABSTRACT

A transmission and control having a limited slip clutch located between the impeller and turbine members of the torque converter to improve transmission efficiency and reduce heat losses. A valve member responsive to turbine speed is incorporated in the control for controlling the engagement force on the clutch thereby controlling the amount of slip between the torque converter impeller and turbine members. A control valve is also included to prevent engagement of the clutch except when the high gear ratio is established in the transmission.

5 Claims, 4 Drawing Figures

INVENTOR.
John D. Malloy
BY
Donald F. Scherer
ATTORNEY

INVENTOR.
John D. Malloy
BY
Donald F. Scherer
ATTORNEY 3,693,478

TRANSMISSION HAVING A CONVERTER CLUTCH AND A CONTROL

This invention is related to transmissions and controls and more particularly the transmissions incorporating a limited slip clutch in the torque converted.

Limited slip clutches operable to provide a slipping connection between the impeller and turbine of the torque converter provide two major advantages. This clutch arrangement provides an increase in fuel economy resulting from reduced slip speeds in the hydraulic torque converter. This is particularly true at low engine speeds when the torque converter efficiency is substantially reduced. The clutch reduces the slip speed between the impeller and turbine thereby increasing the efficiency of the torque converter.

The slip limiting clutch also reduces the heat generated in the torque converter caused by the slipping action between the impeller and turbine. The heat generated by the torque converter must be dissipated by suitable cooling to prevent over-heating of the transmission. Cooling of the transmission fluid is normally accomplished through a heat exhanger in the vehicle radiator. The use of the slip limiting clutch permits a smaller transmission cooling system to be incorporated in the vehicle radiator thereby reducing the expense of the cooling system.

The slip limiting clutch also provides a tighter drive system which reduces the engine speed changes or fluctuations between the power off and power on modes and improves engine braking during vehicle coasting.

The control for engaging and disengaging the converter clutch may be incorporated in the existing transmission control housing or in the hub of the converter clutch. If the control is incorporated in the existing control body a two path or three path control system can be used. In either of these systems a solenoid valve is incorporated into the control system to control the shifting of a clutch engagement control valve. In either of these systems the solenoid is energized to engage the clutch and deenergized to disengage the clutch. Therefore, if the solenoid valve should fail to operate, the clutch would remain disengaged so that a direct connection between the impeller and turbine members is not present when the vehicle is at rest.

In the three path system the converter is pressurized in the normal manner, that is, hydraulic fluid under pressure is delivered at the impeller inlet and discharged at the turbine exit. The third path is selectively connected with converter pressure to disengage the clutch and with exhaust to permit fluid pressure in the converter to engage the clutch. This system requires that an additional path be added to the conventional converter flow circuit.

The two path system uses a conventional converter flow circuit in which the converter is fed at the impeller inlet when the converter clutch is to be engaged and past the front face of the clutch piston when the clutch is disengaged. In both systems the clutch control valve functions to direct more fluid to the cooling system when the clutch is disengaged to provide increased cooling for the torque converter.

Both of these systems incorporate a centrifugal ball regulator valve in the clutch piston. This ball valve functions to regulate the net clutch apply pressure proportional to turbine speed squared thereby modulating the clutch capacity. As the turbine speed increases the clutch apply pressure also increased thereby increasing the torque capacity of the converter clutch thereby reducing the slip between the impeller and turbine. Various vehicle performance parameter signals such as governor pressure, high clutch pressure and engine torque demand can be utilized to control the energization of the solenoid valve to provide engagement and disengagement of the converter clutch under various operating conditions.

The clutch control valve can also be incorporated in the torque converter. This control also utilizes two control valves. One of the control valves is sensitive to converter turbine speed to control the engagement point of the clutch in proportion to that speed squared. A second control valve is utilized to control the engagement of the converter clutch by overriding the centrifugal valve. This second valve is responsive to converter pressure to insure that the clutch is released above a predetermined pressure level in the converter which can be set to limit operation of the converter clutch to the high gear ratio only.

This converter clutch and control are particularly useful with three speed transmissions and controls such as that disclosed in U.S. Pat. No. 3,321,056 issued to Winchell et al. May 23, 1967. With this type of transmission, the operation of the converter clutch is generally limited to third gear only. To this end the governor signal and the high clutch pressure are used to control the energization of the solenoid. Also, the torque demand signal from the vacuum modulator can be used to limit the engagement of the clutch below a predetermined torque demand.

It is an object of this invention to provide in an improved transmission a selectively engageable slip limiting clutch between and input and output members of the torque converter and a control having a valve responsive to the speed of one of the members for controlling the engagement force of the clutch.

Another object of this invention is to provide in an improved transmission and control having a selectively engageable slip clutch, a centrifugal valve member for controlling the engagement force of the clutch and a control valve member for limiting engagement of the clutch during predetermined operating conditions of the transmission.

These and other objects and advantages of this invention will be more apparent from the following description and drawing in which.

Figure 1:
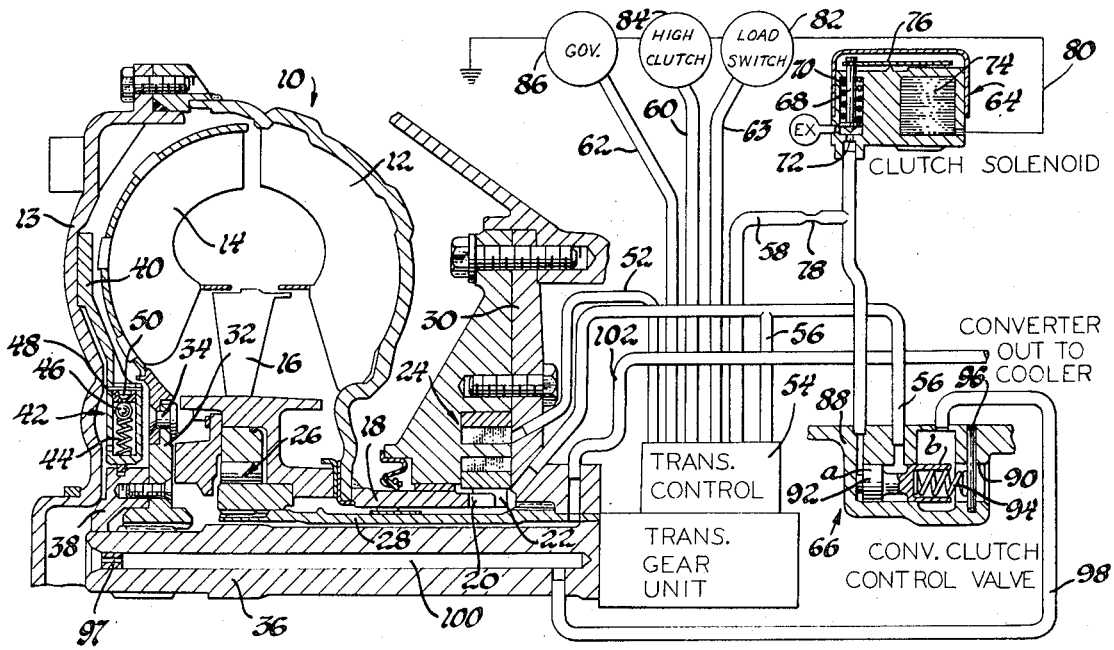
FIG. 1 is a cross-sectional view of a portion of the transmission and control.

Referring to the drawings wherein like characters designate like or corresponding parts there is shown in FIG. 1 a torque converter 10 having an impeller 12, with an impeller drive plate 13 secured thereto, adapted to be driven by an engine, not shown, a turbine 14 and a stator 16. The impeller 12 has a sleeve extension 18 having a spline portion 20 meshing with a spline 22 to provide a drive for a conventional internal-external gear pump generally designated 24. The stator 16 is connected through a one-way brake generally designated 26 and a sleeve shaft 28 to a stationary wall 30 of the transmission. The turbine member 14 is secured to a hub 32 by a plurality of rivets 34 which hub 32 is splined to an input shaft 36 which is connected to drive a transmission gear unit such as planetary gearing 12 shown in U.S. Pat. to Winchell et al. No. 3,321,056. Also secured to the hub 32 is a clutch hub 38 having a clutch plate 40 radially extending therefrom. A ball check valve generally designated 42 is disposed in the clutch hub 38 and comprises a spring 44, a ball 46 and a seat 48. A spring 44 urges the ball 46 into engagement with the seat 48 to close a restricted passage 50 located in the seat 48.

The pump 24 supplies fluid by a passage 52 to a conventional transmission control 54 which may be similar to the control disclosed in the U.S. Pat. to Winchell et al. No. 3,321,056. The transmission control 54 distributes fluid to a converter feed passage 56, a clutch solenoid passage 58, a high clutch switch passage 60, a governor switch passage 62 and a load switch passage 63. These passages 56, 58, 60 and 62 may be continuations of or otherwise connected to passages 110, 120, 132, 122 and 123 of the above-mentioned patent. The clutch solenoid passage 58 is connected to a clutch solenoid generally designated 64 and a converter clutch control valve generally designated 66. The clutch solenoid 64 has a poppet valve 68 surrounded by a spring 70 adapted to urge the poppet 68 into a closing relation with a fluid port 72. The solenoid 64 also has an electromagnet 74 which when energized attracts a lever 76 connected to the poppet 68 to move the poppet 68 away from the port 72 so that fluid pressure in the clutch solenoid passage 58 can be exhausted. A restriction 78 in the clutch solenoid passage 58 limits the flow of fluid through port 72 to prevent a decrease of pressure in the transmission control 54 when the poppet 68 is opened.

The electromagnet 74 is connected to the vehicle electrical power source then to ground through a wire 80, a load switch 82, a high clutch switch 84 in fluid communication with passage 60 and a governor switch 86 in fluid communication with passage 62. The switches 82, 84 and 86 are conventional pressure operated electrical switches having the contacts thereof bias open by a spring member and closed by fluid pressure acting on a piston. The switches 82, 84 and 86 must all be closed before the electromagnet can be energized to open the poppet valve 68. The load switch 82 may be connected to either a conventional vacuum modulator in the transmission control as shown or directly to the engine manifold vacuum. Either of these connections can be adapted to control the load switch 82 so that the load switch 82 will open when a high torque demand is present. The high clutch switch 84 is adapted to be closed whenever the high clutch in the transmission is engaged thereby establishing the high drive ratio. The pressure in passage 62 increases as vehicle speed increases such that the governor switch 86 is adapted to be closed by the transmission governor pressure when the vehicle speed is above a predetermined value. Therefore, the following conditions must be present before the electromagnet is energized. The torque demand must be below a predetermined value, the transmission must be operating in a high gear and the vehicle speed must be above a predetermined value.

If it is desirable, one or more of these switches can be eliminated. For example, if engine coast braking in all gear ratios is desired, the high clutch switch can be omitted. Likewise, the governor or load switch can be omitted depending upon the result desired.

The converter clutch control valve 66 includes a valve housing 88 having a valve bore 90 therein, a spool valve 92 having equal diameter lands $a$ and $b$ slidably disposed in the valve bore 90 and a compression spring 94 compressed between the valve spool 92 and a pin 96 located in the valve body 88. The right end of valve bore 90 is open to exhaust past the end of spool 92. The left end of the valve spool 92 is in fluid communication with the clutch solenoid passage 58 such that when the poppet valve 68 is opened the valve spool 92 will be in the spring set position shown and when the poppet valve is closed the pressure acting on the end of land $a$ will move the valve spool 92 to the right whereby land $b$ will close the exhaust port at the end of valve bore 90. The converter feed passage 56 is in fluid communication with the valve bore 90 between lands $a$ and $b$ and with the torque converter 10 via the space between sleeves 18 and 28 to provide fluid pressure to the torque converter 10. When the valve spool 92 is moved to the right, the converter feed passage 56 is also connected to a clutch disengagement passage 98 between lands $a$ and $b$. The clutch disengagement passage 98 is in fluid communication via a passage 100 in the input shaft 36 with the front face of the clutch plate 40 such that when the clutch disengagement passage 98 is pressurized the fluid pressure will cause the clutch plate 40 to move away from the impeller drive plate 13 to disengage the clutch.

With the converter clutch control valve 66 in the spring set position shown the clutch disengagement passage 98 is exhausted and the converter 10 is fed fluid under pressure via passage 56. The fluid in the converter circulates to provide the fluid drive connection between the impeller 12 and the turbine 14 in a conventional manner and returns from the converter via a converter out passage 102 which is connected to a cooler. The fluid in the converter 10 also passes between the outer periphery of the turbine 14 and the impeller drive plate 13 to act on the rear face of the clutch plate 40 to cause the clutch plate 40 to become engaged with the drive plate 13 thereby providing a slipping friction drive connection between the impeller 12 and the turbine 14. The fluid pressure engaging the clutch plate 40 is determined by the ball check valve 42. The engagement pressure has a lower limit determined by the seating force of spring 44. The net fluid pressure increases from the lower limit as the turbine 14 increases in speed, since the speed of the turbine causes the ball 46 to increase in seating force due to the centrifugal force imposed thereon. Thus, as the turbine speed increases the engagement pressure increases so that the clutch capacity is proportional to square of the speed of the turbine 14. As the clutch capacity increase the slip between the impeller and turbine decreases thereby increasing the efficiency of the torque converter. The fluid passing through the ball check valve 42 is directed to exhaust via a restriction 97 in shaft 36 and passages 100 and 98. Net clutch apply pressure is equal to converter pressure minus back pressure on plate 40. The back pressure is controlled by the ball valve 46 which throttles leakage through restriction 50 against restriction 97 in turbine shaft 36.

The input shaft 36 may be connected with any conventional multiple speed automatic transmission gearing arrangement such as that shown in Winchell et al. 3,321,056.

Figure 2:
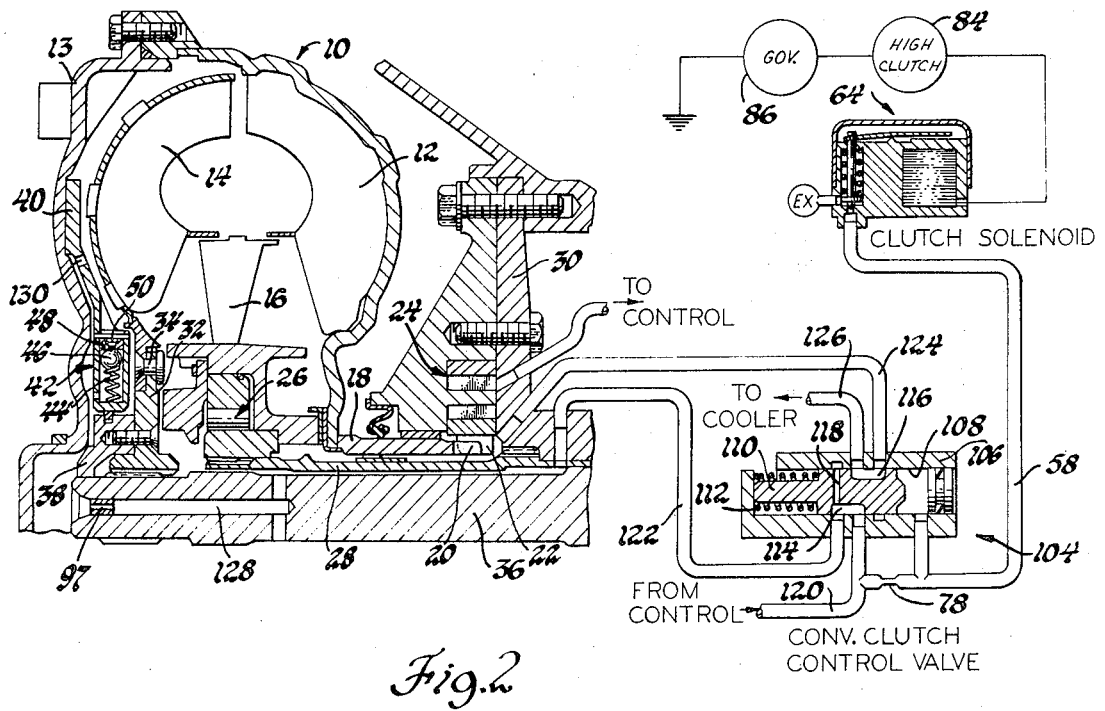
FIG. 2 is a cross-sectional view of another embodiment of the transmission and control.

The transmission and control shown in FIG. 2 includes a torque converter identical in construction with that shown in FIG. 1 and a clutch solenoid valve which is also identical in construction with that shown in FIG. 1. This transmission also has a converter clutch control valve generally designated 104 having a valve body 106, a valve bore 108, a spool valve 110 slidably disposed in the valve bore 108, and a compression spring 112 compressed between the valve spool 110 and the left end of valve bore 108. The valve spool 110 has a pair of recessed areas 114 and 116 located in its outer periphery and a restricted passage 118 providing fluid communication between the recess area 114 and the opposite side of outer diameter of the valve spool 110. Fluid pressure from the transmission control is supplied to the converter clutch control valve 104 through a passage 120 at recessed area 114 of the valve spool 110. In the position shown the valve spool 100 provides communication between passages 120 and a clutch disengagement passage 122 through recessed areas 114 and between a clutch engagement passage 124 and a cooler passage 126 through a recessed area 116. When the valve is in this position with the solenoid valve 64 closed, fluid pressure passes through passage 122 and between the input shaft 36 and the sleeve 28 to passage 128 which is in fluid communication with the front face of the clutch plate 40 thereby disengaging the clutch plate 40. The fluid pressure continues past the clutch plate 40 and feeds the converter 10 between the outer edges of the impeller 12 and the turbine 14. The fluid pressure returns from the converter between sleeves 18 and 28 to passage 124 which is connected to the cooler through recess 116 and passage 126.

When the clutch solenoid valve 64 is opened, the valve spool 110 moves to the right due to the force in spring 112 to connect passage 120 to passage 124 through recess 114 and also to the cooler passage 126 through the restricted passage 118. When the valve spool 110 moves to the right the clutch disengagement passage 122 is exhausted through the left end of valve bore 108. Therefore, with the clutch solenoid valve open, fluid pressure enters the converter via passage 124 and is exhausted from the converter through the ball check valve 42 and a restriction 130 in the clutch plate 40. As described above for FIG. 1, the engagement force and therefore the torque capacity of the clutch plate 40 is controlled by the ball check valve 42 which is responsive to the speed of the turbine 14 and restrictions 50 and 97.

Figure 3:
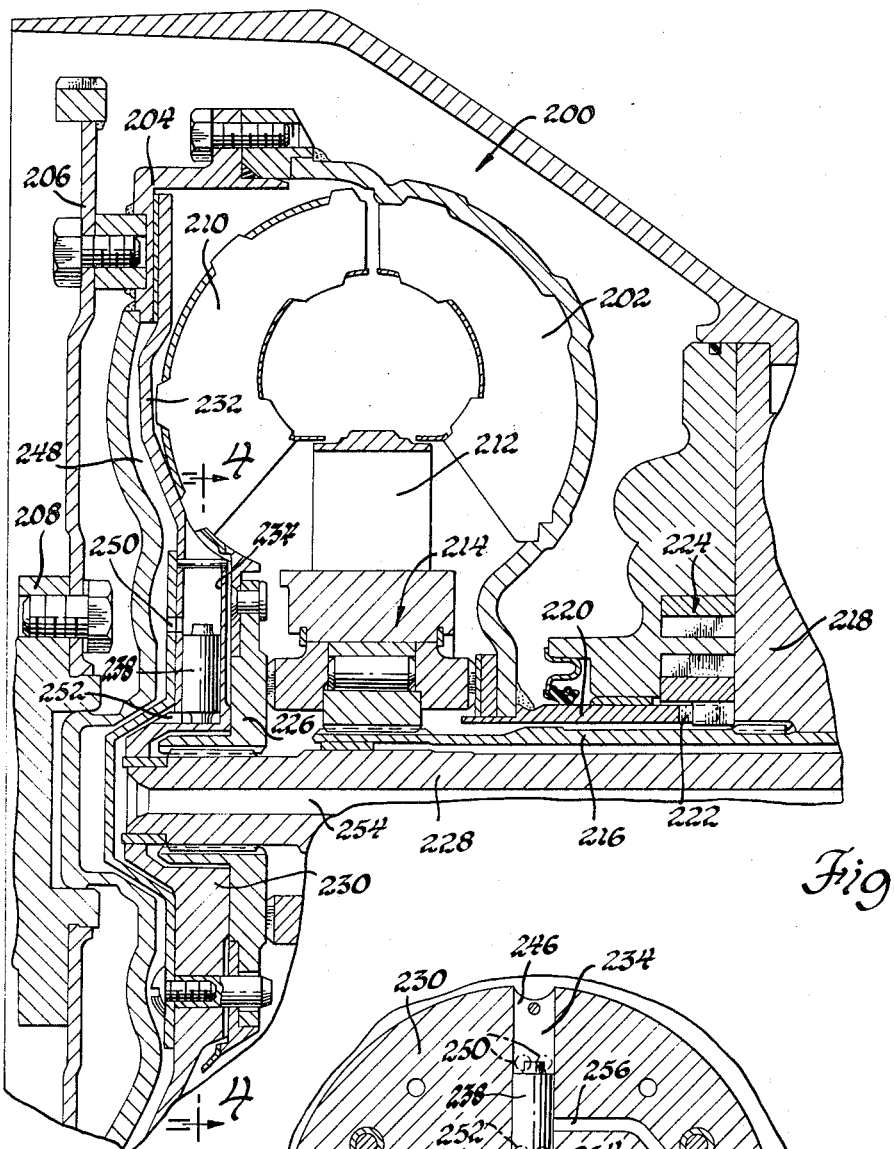
FIG. 3 is a cross-sectional view of still another embodiment of the transmission and control.
Figure 4:
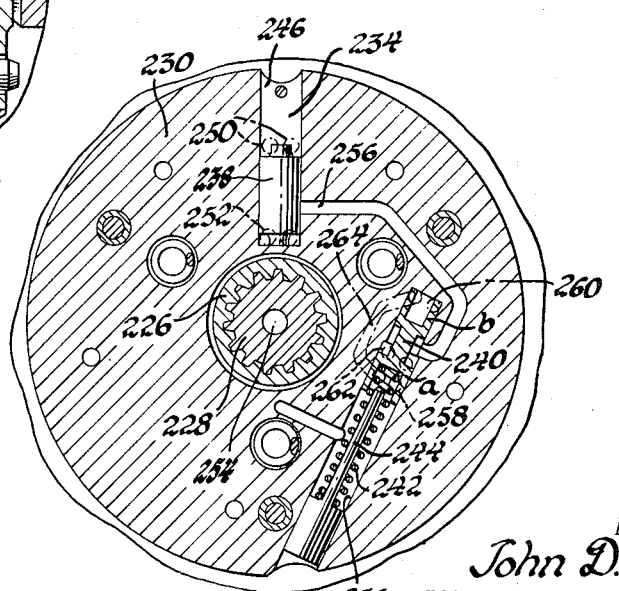
FIG. 4 is a cross-sectional view of the control taken along line 4—4 of FIG. 3.

The transmission shown in FIG. 3 has a torque converter 200 having an impeller 202 secured through a drum 204 to a drive plate 206 which is connected to an engine crank shaft 208. The torque converter 200 also has a turbine 210 and a stator 212 which is drive connected via a one way brake 214 and a sleeve shaft 216 to a stationary component 218. The impeller 202 has a sleeve extension 220, with a spline portion 222 thereon, adapted to drive a conventional internal and external gear pump 224. The turbine 210 is secured to a hub 226 which is splined to a transmission input shaft 228. Also secured to the hub 226 is a valve body 230 and a clutch plate 232. The valve body 230 has a single diameter valve bore 234 and a stepped diameter valve bore 236 machined therein. The valve bore 234 is axially aligned with a radius of the valve body 230 and the input shaft 228 while the valve bore 236 is perpendicular to a radius of the valve body 230 and the input shaft 228. A centrifugal plug 238 is slidably disposed in the valve bore 234 such that the plug 238 will move outward in the valve bore 234 under the influence of centrifugal force proportional to the speed of the turbine 210 squared. A spool valve 240 has a large diameter land $a$ slidably disposed in the valve bore 236 and a smaller diameter land $b$ slidably disposed in a smaller portion of the bore 236. The differential area between lands $a$ and $b$ provides a hysteresis force for the valve spool. The valve spool 240 is positioned in the valve bore 236 by a spring 242 which spool valve 240 is limited in its linear movement by a stop member 244.

The valve bore 234 is open to fluid pressure in the turbine 210 at its outer periphery 246 and is communicated with the space 248 between the clutch plate 232 and the impeller 202 through a passage 250. The lower end of valve bore 234 is in fluid communication with exhaust to a passage 252 in the valve body 230 and a passage 254 in the input shaft 228. The valve bore 234 is also in fluid communication with the valve spool 240 between lands $a$ and $b$ via passage 256. In the position shown the space between lands $a$ and $b$ of valve spool 240 is in fluid communication with the space 248 through openings 262. The end of land $b$ is in fluid communication via ports 260 with the fluid pressure in the converter 200. This fluid pressure is also communicated to ports 258 adjacent land $a$ through a passage 264. With the transmission operating and the plug 238 and valve spool 240 in the positions shown, fluid is supplied to the converter in a conventional manner such that it enters the inner periphery of the impeller and is circulated in the torque converter. A portion of the fluid is exhausted at the inner periphery of the turbine. Fluid pressure in the turbine 210 also passes through the opening 250 to admit fluid pressure to the space 248 to cause the clutch plate 232 to become disengaged from the drum 204. As the turbine speed increases the plug 238 will move radially outward in the bore 234 thereby closing the ports 250. This will permit the pressure between the clutch plate 232 and the turbine 210 to increase above the pressure in space 248 thereby causing the clutch plate 232 to become engaged with the drum 204 due to the differential pressure on the clutch plate. Also, as the plug 238 moves outward in the bore 234 the space 248 will be exhausted by passage 256 when it is opened to ports 252. The bottom end of plug 238 is always exhausted. Once the plug starts radially out it moves all the way to the stop because of the changing radius of center of gravity. This gives the value hysteresis to insure stability. No effort is made to modulate capacity as valve 240 will release clutch before drive becomes harsh. Since the converter receives its fluid pressure from the transmission control as described above for FIGS. 1 and 2 the converter pressure is a function of governor pressure and vacuum modulator pressure as described in the patent to Winchell et al. 3,321,056. Since the converter pressure acts on the end of valve land b through ports 260 as the converter pressure increases above a predetermined amount, representing a high torque demand, the valve spool 240 will be moved against the compression spring 242. As the valve spool 240 is moved in the valve bore 236 land b will close passage 256 while land a will open port 258 to port 262 thereby directing converter pressure to the space 248 to disengage the clutch plate 232. The differential area is pressurized at this time to improve stability of the valve. Since the drive ratio shift points in the transmission control are also a function of torque demand and gear speed, it is possible to set the predetermined shift point of valve spool 240 so that clutch operation can be limited to high gear only.

Obviously, many modifications and variations are possible in light of the above teaching. It is to be understood that within the scope of the appended claims, the invention may be practiced otherwise than is specifically described.

What is claimed is:

1. A transmission and control comprising torque converter means having an input member and an output member; clutch means drivingly connected with said output member and being selectively engageable at various slipping conditions with said input member; and control means for controlling the engagement of said clutch means including a source of fluid pressure in fluid communication with said torque converter means and said clutch means, clutch control valve means for controlling the flow of fluid to and from said clutch means, and centrifugal valve means responsive to the speed of one of said members of said torque converter means for controlling the engagement pressure and slipping condition of said clutch means in proportion to the speed of said one member of said torque converter means.

2. A transmission and control comprising torque converter means having an impeller member and a turbine member; clutch means having a hub portion drivingly connected with said turbine member and a clutch plate secured to said hub portion being selectively engageable at various slipping conditions with said impeller member; and control means for controlling the engagement of said clutch means including a source of fluid pressure in fluid communication with said torque converter means and said clutch means, clutch control valve means for controlling the flow of fluid to and from said torque converter means and said clutch means, and centrifugal valve means disposed in said hub portion in fluid communication with said torque converter means responsive to the speed of said turbine member for controlling the engagement pressure and slipping condition of said clutch plate in proportion to the speed of said turbine member.

3. A transmission and control comprising torque converter means having an impeller and a turbine; clutch means having a clutch plate drivingly connected with said turbine and being selectively engageable at various slipping conditions with said impeller; said clutch plate having a forward face and a rearward face and control means for controlling the engagement of said clutch means including a source of fluid pressure in fluid communication with said torque converter means and said clutch means, clutch control valve means for controlling the flow of fluid to the rearward face of said clutch plate for engaging said clutch means and to the forward face clutch plate for disengaging said clutch means, and centrifugal valve means responsive to the speed of said turbine for controlling the pressure of the fluid directed to said rearward face to control the slipping condition of said clutch means in proportion to the speed of said turbine.

4. A transmission and control comprising torque converter means having an input member and an output member; clutch means drivingly connected with said output member and being selectively engageable at various slipping conditions with said input member; and control means for controlling the engagement of said clutch means including a source of fluid pressure in fluid communication with said torque converter means and said clutch means, solenoid valve means in fluid communication with said source; switch means controlled by vehicle speed and transmission drive ratio for controlling said solenoid valve means, clutch control valve means in fluid communication with said source and said solenoid valve means and being responsive to said solenoid valve means for controlling the flow of fluid to and from said torque converter means and said clutch means, and centrifugal valve means responsive to the speed of one of said members of said torque converter means for controlling the engagement pressure and slipping condition of said clutch means in proportion to the speed of said one member of said torque converter means.

5. A transmission and control comprising torque converter means having an input member and an output member; converter clutch means drivingly connected with said output member and being selectively engageable at various slipping conditions with said input member; planetary gearing means having a transmission output, a low gear ratio and a higher gear ratio and high clutch means for establishing the high gear ratio; and control means for controlling the engagement of said converter clutch means and said high clutch means including a source of fluid pressure in fluid communication with said torque converter means and said clutch means, governer means for providing a pressure proportional to the speed of said transmission output, load means for providing a pressure proportional to the transmission load, solenoid valve means in fluid communication with said source, three switch means controlled by said governor means, said high clutch means, and said load means respectfully for controlling said solenoid valve means, clutch control valve means in fluid communication with said source and said solenoid valve means and being responsive to said solenoid valve means for controlling the flow of fluid to and from said torque converter means and said converter clutch means, and centrifugal valve means responsive to the speed of one of said members of said torque means for controlling the engagement pressure and slipping condition of said converter clutch means in proportion to the speed of said one member of said torque converter means.

* * * * *

PO-1050
(5/69)

UNITED STATES PATENT OFFICE
CERTIFICATE OF CORRECTION

Patent No. 3,693,478  Dated September 26, 1972

Inventor(s) John D. Malloy

It is certified that error appears in the above-identified patent and that said Letters Patent are hereby corrected as shown below:

Column 1, line 22, "exhanger" should read --exchanger--.
Column 2, line 35, "and" should read --the--.
Column 8, line 6, "face clutch" should read --face of said clutch--; line 60, "torque means" should read --torque converter means--.

Signed and sealed this 3rd day of April 1973.

SEAL)
ttest:

DWARD M. FLETCHER, JR.
ttesting Officer

ROBERT GOTTSCHALK
Commissioner of Patents